Dec. 8, 1964 M. DVORIN 3,160,022

MULTIPLE SPEED DRIVE UNIT

Filed Aug. 3, 1961 2 Sheets-Sheet 1

INVENTOR.
MARTIN DVORIN
BY Amster & Levy
ATTORNEYS

Dec. 8, 1964 M. DVORIN 3,160,022

MULTIPLE SPEED DRIVE UNIT

Filed Aug. 3, 1961 2 Sheets-Sheet 2

INVENTOR.
MARTIN DVORIN
BY Amster + Levy
ATTORNEYS

United States Patent Office 3,160,022
Patented Dec. 8, 1964

3,160,022
MULTIPLE SPEED DRIVE UNIT
Martin Dvorin, Rochester, N.Y., assignor, by mesne assignments, to General Electric Company, a corporation of New York
Filed Aug. 3, 1961, Ser. No. 129,010
3 Claims. (Cl. 74—190)

The present invention relates generally to variable speed phonographs and specifically to an improved variable speed driving mechanism for rotating a phonograph turntable selectively at any one of a number of different speeds such that the phonograph may be used to play recordings at any one of the standard speeds, i.e., 78, 45, 33⅓ and 16 revolutions per minute.

With the introduction of long playing records which were designed to be played at a speed of 33⅓ revolutions per minute, a need was created for a phonograph which would play records at the standard speed of 78 revolutions per minute, but also at the new speed of 33⅓ revolutions per minute. This situation was still further aggravated by the introduction of the standard 45 r.p.m. records and then following that, the introduction of the 16 r.p.m. records. In order to fulfill the need for multiple speed phonographs, a variety of speed change mechanisms were developed to selectively drive a phonograph table at one of a number of the different speeds. Many of these devices were extremely successful; however, need for improvement in these devices remain. In phonograph changer assemblies for multispeed operations a minimum space requirement demands the smallest possible driving functions. In addition, the cost factor of manufacturing a selective variable speed drive unit for phonograph changers was and is of extreme importance since phonograph changers have become a product of mass consumption within a field of strenuous competition. Therefore, continuous efforts have been made to improve the performance characteristics of variable speed drive mechanisms and, at the same time, to reduce manufacturing costs.

Accordingly, it is an object of the present invention to provide an improved variable speed phonograph drive mechanism. Specifically, it is one of the objects of the present invention to provide an improved variable speed phonograph drive mechanism of high performance characteristics which may be manufactured at a relatively low unit price.

It is a further object of the present invention to provide a phonograph drive mechanism of relatively small size which may be employed to drive a phonograph turntable at a variety of selected speeds.

In accordance with one illustrative embodiment of the present invention there is provided a variable speed drive for a turntable of the type which has a depending skirt against which the drive mechanism is engaged for rotating the turntable. A vertically oriented drive shaft is provided with a plurality of stepped cylindrical driving surfaces against which is engaged an idler and speed-change wheel. A two-link knee action mounting means is provided to mount the idler wheel for horizontal movement into and out of engagement with the drive shaft and the depending skirt of the turntable. The knee action mounting means are positioned on a vertical slide shaft thereby providing vertical movement of the idler wheel between the various stepped driving surfaces of the drive shaft. A horizontally and linearly movable cam member having a plurality of stepped cam surfaces is engaged with the knee action mounting means to move the idler wheel between the various stepped driving surfaces in a speed change operation. The idler wheel is biased for interengagement between the drive shaft and the depending turntable skirt by means of a spring member which is effective to maintain contact between the idler wheel and the drive shaft and turntable skirts during the speed change operations. In addition, a neutral positioning lever is mounted on the phonograph for sliding movement and is engageable with the knee action mounting means to oppose the bias force exerted by the spring member and to pull the idler wheel out of interengagement with the drive shaft and the depending annular skirt of the turntable. By the simple sliding movement of the neutral positioning lever, the idler wheel may be moved to a neutral position irrespective of the speed change mechanisms, the particular speed at which the mechanism is oriented, and generally, irrespective of the mechanical position of any of the interengaging members of the variable speed drive mechanism.

The above brief description, as well as further objects, features and advantages of the present invention will be best understood by a reference to the following description of a presently preferred embodiment when taken in conjunction with the accompanying drawings wherein.

Figure 1:
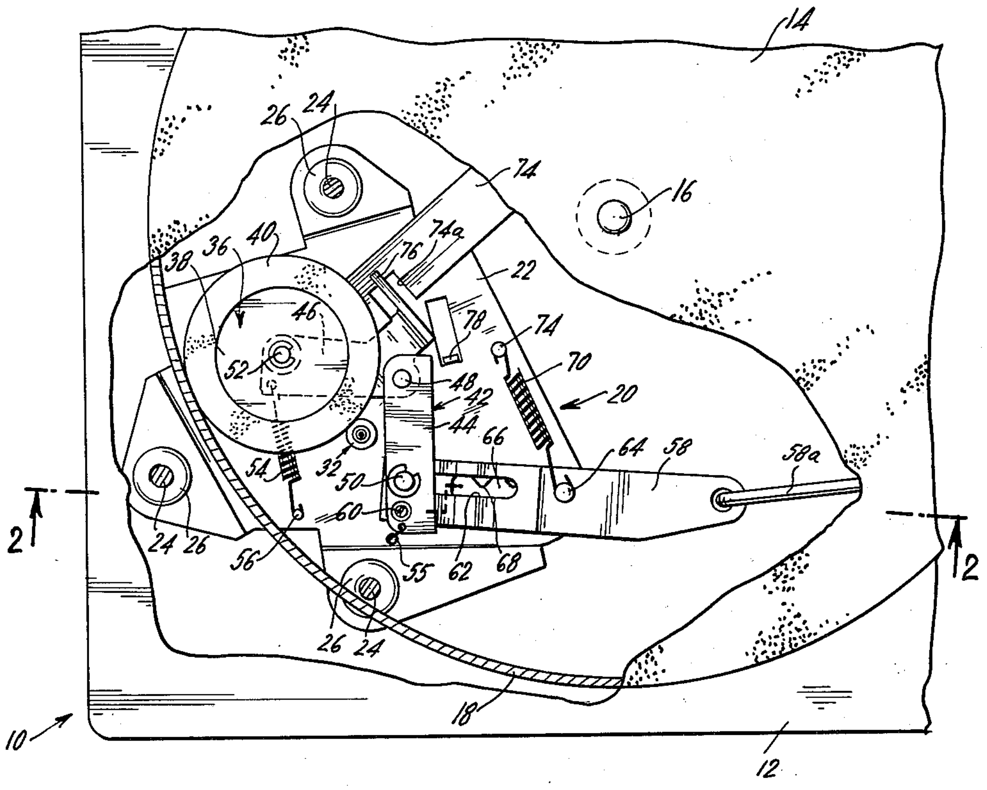
FIG. 1 is a plan view of a portion of a phonograph including a variable speed drive according to the present invention with portions broken away for the sake of clarity and showing the driving mechanism in position to drive the turntable at its maximum speed.

Referring now specifically to the drawings, there is shown in FIG. 1 a portion of a phonograph 10 which includes a chassis 12 and a turntable 14 mounted on the chassis 12 at a pivot or spindle 16. The turntable 14 has a depending annular skirt 18 at its outer portion which is adapted to be contacted by a driving member to drive the turntable 14 in a clockwise direction about the central pivot point 16.

A drive unit 20, by its chassis 22, is mounted below the phonograph chassis 12 on a series of three fastener elements 24 in association with the resilient vibration-damping collars 26.

The drive unit 20 includes a constant speed electric motor 28 which is secured below the drive chassis 22 by means of the bracket members 30. A vertically oriented drive shaft 32 extends upwardly from the motor 28 and is supported by the bearings 34. The drive shaft 32 is provided, at its upper end, with a number of cylindrical coaxial driving surfaces **32*a*, 32*b*, 32*c*, 32*d*, of varying diameters. It will be appreciated from the following that driving surface 32*a* is effective to drive the turntable at a speed of 78 revolutions per minute, 32*b* at a speed of 45 revolutions per minute, 32*c* at a speed of 33⅓ revolutions per minute, and, 32*d***, at a speed of 16 revolutions per minute.

An idler and speed change wheel 36, including a central bearing hub 38 and a peripheral resilient rolling surface 40, is positioned between the driving surfaces of the drive shaft 32 and the depending annular skirt 18 of the phonograph turntable 14. When the idler wheel 36 is engaged at driving surface **32*a* of the drive shaft it will obviously be rotated at a faster rate of speed than it would be when in contact with the driving surfaces of smaller diameter of the drive shaft 32 and thereby, through its rolling contact with the skirt 18 of the turntable 14, will drive the turntable 14 at a relatively high rate of speed. Conversely, contact of the idler wheel 36 with the driving surface 32*d*, will drive the turntable 14** at a relatively low rate of speed.

Figure 2:
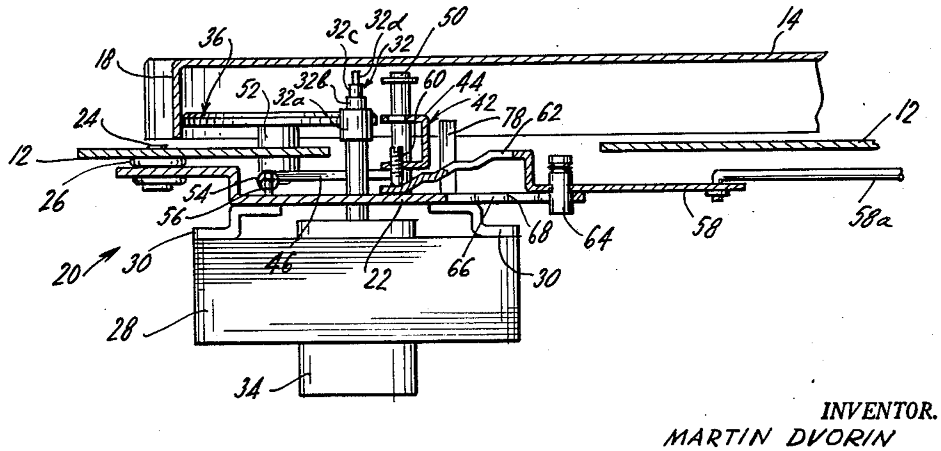
FIG. 2 is a secitonal view taken along the line 2—2 in FIG. 1 and looking in the direction of the arrows.
Figure 4:
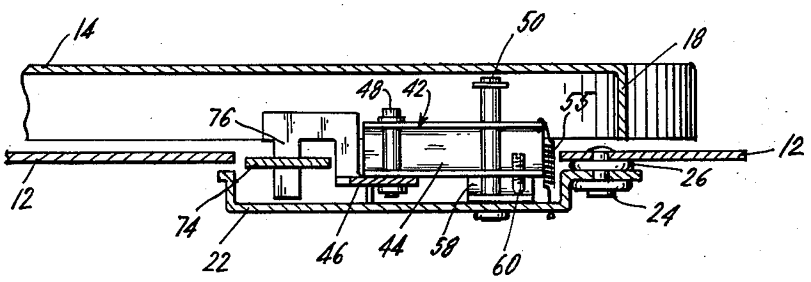

The idler wheel 36 is mounted on knee action mounting means 42 including a first arm 44 and a second arm 46 pivotally connected thereto at the pivot point 48. The knee action mounting means 42 is secured to the drive chassis 22 by a sliding and pivotal connection to a vertically oriented slide shaft 50 which extends upwardly from and is rigidly connected to the chassis 22. As may be seen in FIGS. 2 and 4, the first arm 44 of the knee action mounting means 42 is channel shaped such that a smooth sliding interengagement may be had between a pair of holes formed in the arm 44 and the slide shaft 50. The idler wheel 36 is pivotally mounted at the opposite end of the mounting means 42 by engagement with the shaft 52. It will be appreciated that pivotal movement of the first arm 44 about the shaft 50 and pivotal movement of the second arm 46 with respect to the first arm 44 about the pivot point 48 is effective to provide free horizontal movement of the idler wheel 36 such that it may be easily positioned in interengagement between the flange 18 of the turntable and the drive shaft 32 as shown in FIGS. 1 and 2. A biasing spring 54, secured at one end to a pin 56 on the chassis 22 and the other end to the second arm 46, is effective to bias the idler wheel 36 into interengagement with the turntable flange 18 and the drive shaft 32. It will be further appreciated that the sliding interengagement of the mounting means 42 on the slide shaft 50 effectively provide means whereby the idler wheel 36 may be moved vertically to the various levels of the driving surfaces 32*a*, 32*b*, 32*c*, 32*d*. The weight of the idler wheel 36 and the mounting means 42, in combination with the biasing spring 55 is effective to normally urge the assembly of the mounting means 42 and the wheel 36 into its lowermost position i.e. the position for driving the turntable at 78 revolutions per minute as shown in FIGS. 1 and 2.

Horizontally and linearly movable cam means are provided to selectively position the idler wheel 36 at the various vertical locations of the driving surfaces on the drive shaft 32. A cam element 58 is provided for interengagement with a cam follower 60 secured to the first arm 44 of the mounting means 42. As may be best seen in FIG. 2, the cam element 58 has a series of vertical steps formed therein which correspond in vertical displacement to the various positions of the idler wheel 36 when in contact with the various driving surfaces on the drive shaft 32. The cam element 58 is guided for linear movement by the interengagement of a guide slot 62, formed within one end of the cam element, with the base of the slide shaft 50. A second guide means includes the downwardly extending stud 64 which is received within a generally linear slot 66 formed in the chassis 22. The combined engagement of the slide shaft 50 within the slot 62 and the stud 64 within the slot 66 defines a generally linear path of travel for the cam member 58. As the cam member 58 is moved longitudinally, various ones of the stepped surfaces of the cam member will be brought under the cam follower 60 thereby to alter the vertical location of the mounting arms 42 and thereby the idler and speed-shift wheel 36. A shift rod 58*a* is secured to one end of the cam element 58 to drive same through its linear movement. The inner edge of the positioning slot 66 is of generally undulating configuration such that a series of four depressions 68 are formed. These depressions are at spaced apart locations which are equal to the horizontal distance between the various land portions of the cam 58. The depressions 68 serve as positioning means to hold the cam member 58 in its various positions such as to accurately position the idler wheel at the selected positions of the various driving surfaces of the drive shaft 32. The depressions 68 are engaged by the depending portion of the stud 64 and are held therein by the action of a positioning spring 70 which is secured at one end to the upper portion of the stud 64 and at the outer end to a pin 72 mounted on the chassis 22 and is effective to bias the stud 64 into engagement with the depressions 68. The cam follower 60 comprises a threaded element which is received within the lower wall of the first arm 44 such that the relative position of the knee action mounting means 42 with the cam element 58 may be given an initial adjustment for the accurate alignment of the idler wheel 36 with the various driving surfaces on the drive shaft 32.

It should be noted that during the speed change cycle, i.e., when the cam element 58 is moved from one position to another position thereby moving the mounting means 42 and the idler 36 from one vertical position to another, the idler wheel 36 leaves its engagement with one driving surface and comes into interengagement with another driving surface on the drive shaft 32. When going from a driving surface of a relatively larger diameter to a driving surface of a smaller diameter, the idler wheel 36 merely "falls off" the edge of the larger diameter driving surface onto the smaller diameter driving surface. The biasing spring 54 is effective to keep the idler wheel interengaged with the drive shaft during this change. When a speed change is made from a lower speed to a higher speed, the idler wheel travels from a driving surface of a lower diameter to one of greater diameter. In order to accomplish this result, the idler wheel merely "walks up" over the edge of the larger diameter driving surface and is the positioned to perform its normal driving function. Again, the spring 54 is effective during this speed shift to maintain the idler wheel 36 in interengagement with the drive shaft 32. The provision of a reasonably resilient material for the rolling surface 40 of the idler 36 is sufficient to perform this "drop off" or "walk up" function.

Figure 3:
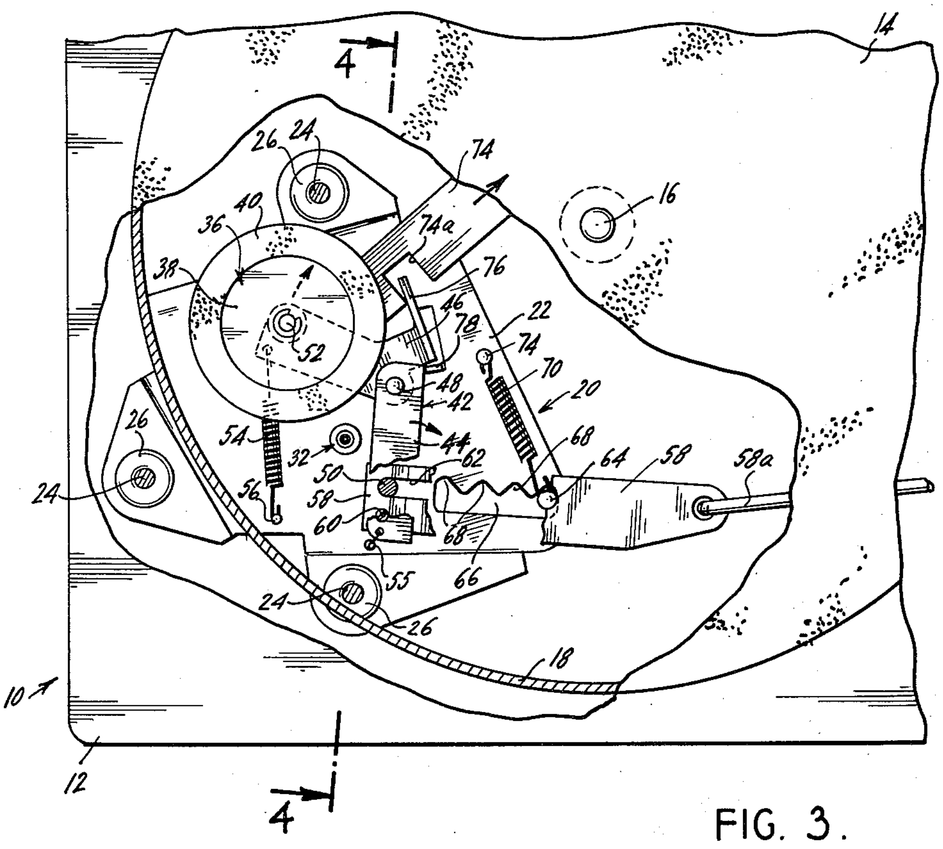
FIG. 3 is a plan view similar to that shown in FIG. 1; but wherein the various elements of the variable speed drive are moved into their neutral position; and, FIG. 4 is a sectional view taken along the line 4—4 of FIG. 3 and looking in the direction of the arrows.

In order to fulfill the requirement for a neutral position for the idler wheel 36, there is provided a neutral shift lever 74 which is engageable with the knee action mounting means 42 to move the idler wheel 36 into a neutral position, i.e. out of interengagement with the depending turntable skirt 18 and the drive shaft 32. The neutral shift lever 74 is mounted on the phonograph chassis 12 for linear motion in the direction of the arrow shown in FIG. 3. A cut out portion 74*a* is engageable with the second arm 46 of the mounting means 42 at the outwardly and downwardly depending extension 76 of the second arm 46. It will be appreciated, that when the lever 74 is moved upwardly and to the right as shown in FIG. 3, the forward end of the cut out 74*a* will contact the extension 76 of the second arm 46 and will pivot the second arm 46 against the bias force of the spring 54 thereby disengaging the contact surface 40 of the idler wheel 36 from the turntable flange 18 and from the drive shaft 32. In addition, the first arm 44 of the mounting means 42 will be moved in a clockwise direction about the slide shaft 50, however, its movement is blocked by an upstanding member 78 which is formed from the drive unit chassis 22. The forward end of the first arm 44 contacts the member 78 to limit its clockwise movement about the slide shaft 50 such that the maximum amount of motion transmitted from the neutral shift lever 74 is transmitted to the second arm 46 to move the mounting means 42 and the idler wheel 36 into its neutral position as shown in FIG. 3.

The shift lever 74 is connected at its other end, not shown, to either a manual operating means which is effective to place the drive unit 20 into a neutral position at any point in the operations of the turntable 10, or alternatively, to the main on-off switch for the turntable 10 such that the idler wheel 36 is disengaged from the drive shaft and the depending turntable flange 18 when the phonograph is not in use thereby to avoid the formation of "flats" on the idler wheel. Still further, the lever 74 may be connected to the sequencing mechanism for the automatic phonograph such that the idler wheel may be moved into its neutral position at any selected point during the operations of the phonograph irrespective of the position of the members of the drive mechanism 20.

It will be appreciated that there is provided in accordance with the present invention an effective phonograph variable speed drive mechanism of extremely simple construction, and of relatively small size which may be manufactured at a relatively low unit cost. The present invention has eliminated the need for means to move the idler wheel out of engagement with the drive shaft preliminary to the changing from one driving speed to another driving speed. In addition the present invention has provided means for the placement of the driving mechanism into a neutral position at any given point during the operations of the phonograph and irrespective of the positions of the various operating member thereof.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. In a variable speed phonograph drive including a motor, a drive shaft having a plurality of stepped driving surfaces, an idler wheel, knee-action mounting means for mounting said idler wheel for movement toward and away from said drive shaft, and a vertical slide shaft on which said mounting means are secured for vertical movement of said idler wheel between said various driving surfaces, a biasing spring for maintaining engagement between said idler wheel and said drive shaft, a horizontally movable cam member having a plurality of stepped cam surfaces of like number to the number of said stepped driving surfaces, means guiding the movement of said cam through a substantially linear travel, said guide means including positioning means to retain said cam at selected locations along its path of linear travel, follower means mounted on said mounting means, said cam engaged with said follower means on said mounting means to raise and lower said idler wheel in response to said linear movement of the cam to change speeds, said biasing spring normally being effective to maintain said idler wheel in engagement with said drive shaft during said speed change operations, and means for placing said phonograph drive in a neutral position including a neutral shift lever engageable with said mounting means and movable independently of any other element of said phonograph drive to oppose said biasing spring and move said idler wheel out of interengagement with said drive shaft.

2. In a variable speed phonograph drive for driving a turntable having a depending skirt, said drive including a motor, a drive shaft having a plurality of stepped driving surfaces, an idler and speed-change wheel, knee-action mounting means on which said idler wheel is mounted for movement into and out of engagement between said drive shaft and said depending skirt, said knee action mounting means including a first arm upon which said idler wheel is rotatably supported and a second arm pivotally coupled to said first arm, a vertical slide shaft on which said second arm of said mounting means is located for movement of said idler wheel between said various stepped driving surfaces, a horizontally movable cam element engaged with said second arm of said mounting means for moving said idler wheel vertically to change the speed of said phonograph drive, and a spring member to bias said idler wheel into engagement with said drive shaft and said depending skirt and to maintain contact therewith during said speed change operation, and a neutral positioning member mounted for sliding movement and engageable with said first arm of said mounting means to oppose the bias of said spring member and to move said idler wheel, independently of said speed change mechanism out of interengagement with said drive shaft and said depending skirt, said drive being free from any mechanism for opposing said spring bias and for moving said idler wheel away from said drive shaft in response to movement of said cam, said mounting means and said idler wheel for changing the speed of said drive, said idler wheel having a peripheral surface of resilient material such that said idler may be moved, while in contact with said drive shaft, from one of said driving surfaces to another of said driving surfaces of a larger diameter.

3. A variable speed phonograph drive for driving a turntable having a depending skirt comprising a motor, a drive shaft having a plurality of stepped driving surfaces of progressively increasing diameters, an idler and speed-change wheel, knee-action mounting means on which said idler wheel is mounted for movement into and out of engagement between said drive shaft and said depending skirt including a first arm and a second arm pivotally connected at one of its ends to one end of said first arm, said idler wheel being pivotally mounted at the other end of said second arm, a stationary vertical slide shaft, said first arm being pivotally and slidably mounted on said shaft for movement of said idler wheel between said various stepped driving surfaces, a horizontally movable cam element engaged with said mounting means for moving said idler wheel vertically to change the speed of said phonograph drive, a spring member biasing said idler wheel into engagement with said drive shaft and said depending skirt and maintaining contact therewith during said speed change operation, said drive being free from any mechanism for opposing said spring member bias and for moving said idler wheel away from said drive shaft in response to movement of said cam, said mounting means and said idler wheel for changing the speed of said drive, said idler wheel having a peripheral surface of resilient material such that said idler may be moved, while in contact with said drive shaft, from one of said driving surfaces to another of said driving surfaces of a larger diameter, and a neutral positioning member mounted for sliding movement and engageable with said second arm of said mounting means to oppose the bias of said spring member and to move said idler wheel, independently of said speed change mechanism out of interengagement with said drive shaft and said depending skirt.

References Cited by the Examiner

UNITED STATES PATENTS

| | | | |
|---|---|---|---|
| 2,551,266 | 5/51 | Hartman | 74—190 |
| 2,650,504 | 9/53 | Tateishi | 74—199 |
| 2,925,737 | 2/60 | Hartman | 74—190 X |
| 2,926,536 | 3/60 | Bradley | 74—200 |
| 2,939,327 | 6/60 | Starr | 74—200 |
| 2,961,883 | 11/60 | Hartman | 74—200 |
| 2,997,815 | 4/61 | Guest. | |

DON A. WAITE, *Primary Examiner.*